(12) United States Patent
Yeh et al.

(10) Patent No.: US 9,864,180 B2
(45) Date of Patent: Jan. 9, 2018

(54) ASYMMETRIC CURVED-SURFACE PRISMATIC IMAGE DISPLAY OPTICAL SYSTEM

(71) Applicant: Min Aik Technology Co., Ltd., Taoyuan (TW)

(72) Inventors: Shih-Po Yeh, Taoyuan (TW); Wei-Lung Lai, Taoyuan (TW); Hsin-I Chen, Taoyuan (TW)

(73) Assignee: MIN AIK TECHNOLOGY CO., LTD., Taoyuan (TW)

( * ) Notice: Subject to any disclaimer, the term of this patent is extended or adjusted under 35 U.S.C. 154(b) by 56 days.

(21) Appl. No.: 15/153,750

(22) Filed: May 13, 2016

(65) Prior Publication Data

US 2017/0329114 A1    Nov. 16, 2017

(51) Int. Cl.
| | |
|---|---|
| *G02B 17/08* | (2006.01) |
| *G02B 27/01* | (2006.01) |
| *G02B 17/00* | (2006.01) |
| *G02B 5/04* | (2006.01) |

(52) U.S. Cl.
CPC ............ *G02B 17/086* (2013.01); *G02B 5/04* (2013.01); *G02B 17/006* (2013.01); *G02B 27/0172* (2013.01); *G02B 2027/011* (2013.01); *G02B 2027/013* (2013.01)

(58) Field of Classification Search
CPC  G02B 27/01; G02B 27/0101; G02B 27/0149; G02B 27/017; G02B 27/0172; G02B 27/0176; G02B 27/0179; G02B 17/086; G06T 19/006; H04N 5/7491; H04N 13/044

USPC ..... 359/13–14, 618, 629–633, 831; 345/7–9, 345/632–633; 348/113–120; 349/11; 362/337, 339, 626, 620

See application file for complete search history.

(56) References Cited

U.S. PATENT DOCUMENTS

| | | | | |
|---|---|---|---|---|
| 5,223,983 | A * | 6/1993 | Oono ................... | G02B 27/144 242/342 |
| 6,190,014 | B1 * | 2/2001 | Kusano ................ | G02B 27/145 348/E5.141 |
| 2007/0177275 | A1 * | 8/2007 | McGuire, Jr. .......... | G02B 17/08 359/630 |
| 2016/0103306 | A1 * | 4/2016 | Takahashi .......... | G02B 17/0816 345/8 |

\* cited by examiner

*Primary Examiner* — Ricky Mack
*Assistant Examiner* — Kristina Deherrera
(74) *Attorney, Agent, or Firm* — Leong C. Lei

(57) ABSTRACT

An asymmetric curved-surface prismatic image display optical system includes a first prism and second and third prisms respectively arranged in front of and behind the first prism. The first prism includes a light-exiting planar surface that is at an eye-adjacent side and is opposite to a light-entering planar surface of the second prism with an air gap therebetween and may serve as a reference for inspection of a free-form curved surface. The second prism has a light-exiting planar surface at the eye-adjacent side and parallel to a side planar surface of the third prism to allow an external-world image to be seen more clearly. Light from an image displaying panel first enters the first prism and is subjected to total internal reflection by the light-exiting planar surface toward the reflective curved surface to be reflected and re-directed to transmit through the second prism for image formation on a retina.

12 Claims, 9 Drawing Sheets

ASYMMETRIC CURVED-SURFACE PRISMATIC IMAGE DISPLAY OPTICAL SYSTEM

(a) TECHNICAL FIELD OF THE INVENTION

The present invention relates generally to an asymmetric curved-surface prismatic image display optical system, which involves a devices that projects an image, through an optical system, into eye pupils to allow the eyes to read information contained in the image, while observing external views.

(b) DESCRIPTION OF THE PRIOR ART

Advanced asymmetric curved-surface prismatic image display optical systems that are currently available have developed such that an optical device may be involved to project an image to the eye pupils to allow the eyes to see forwards, in a natural way, for watching information of the image. Such a device is generally positioned in front of eyes or is worn on a human head to facilitate watching. Such a device can be an immersive device or a non-immersive device. The non-immersive device, which is believed the main stream of the future, displays a screen of image and also allows the user to see an external-world image through the screen. Such a characteristic is commonly applied to augmented reality (AR). AR designs that are currently available in the market are designs that involve more free curved surfaces in the optical system. Such a multiple curved surface technology is one of the major technical solutions adopted in products of this kind. Designs of this technology have been improved a lot, yet they still suffer, in the use and manufacture thereof, certain major drawbacks that are briefly discussed below.

Firstly, since in the known devices, the primary optical lens used generally has multiple free-form curved surfaces, to clearly see an external-world image through a screen, a compensation lens must be provided behind a free-form curved surface of the optical lens. However, when the first surface of the optical lens adopts a design involving a curved surface or a free-form curved surface, the compensation lens located behind cannot completely compensate all the fields of view in the front so that the clearness of the external-world image behind the screen is generally poor, making it impossible to reach the level of being perfect.

Secondly, the manufacture of a free-form curved surface, although can be done with ultra-precision machining techniques, still faces extreme difficulties of measuring, inspecting, and correcting an injection-molded object. Such difficulties are generally caused by the problem of having no good solution of positioning for conducting measurement. Since there is no reference surface as a datum for measurement tolerances of product parts, it is hard to make correction on the injection-molded products. Consequently, such a process would need more time to conduct inspection and more human labor is involved to make a better-corrected lens through an empirical process.

Thus, it is a challenge of the industry to develop a low-cost structure to conduct positioning, inspecting, and correcting of a primary optical lens in order to improve image clearness and to allow a correction operation to be conducted in a more precise manner to thereby save manufacturing time and costs of labor and materials.

SUMMARY OF THE INVENTION

Thus, the primary object of the present invention is to overcome the drawbacks of the prior art by taking into consideration that by designing a surface of an optical element that is adjacent to eyes as a planar surface and also designing a surface that is close to an external-world image also as a planar surface, eyes, when seeing an external-world image through the planar surfaces that are arranged parallel, would see a clear image just like seeing through a window glass panel so that perception of the external-world image by the eyes is not negatively affected and a clear image can be perceived thereby overcoming the first drawback discussed above.

Another object of the present invention is to overcome the issue of measurement and correction by designing a reflective surface of an intermediate element of an optical system as a planar surface so that in the manufacture of a free-form element, the planar surface can be taken as a reference surface or datum for measurement and correction thereby overcoming the second drawback discussed above.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 4-1 is a schematic view illustrating a second example of use of the first embodiment of the present invention.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
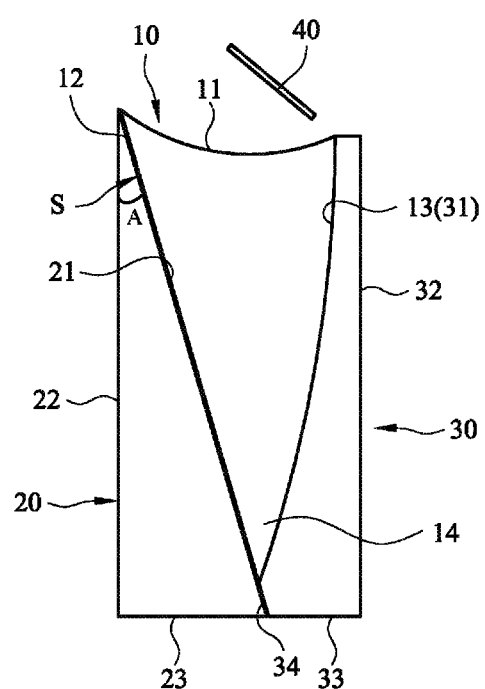
FIG. 1 is a schematic view showing a first embodiment of the present invention in an assembled form.
Figure 2:
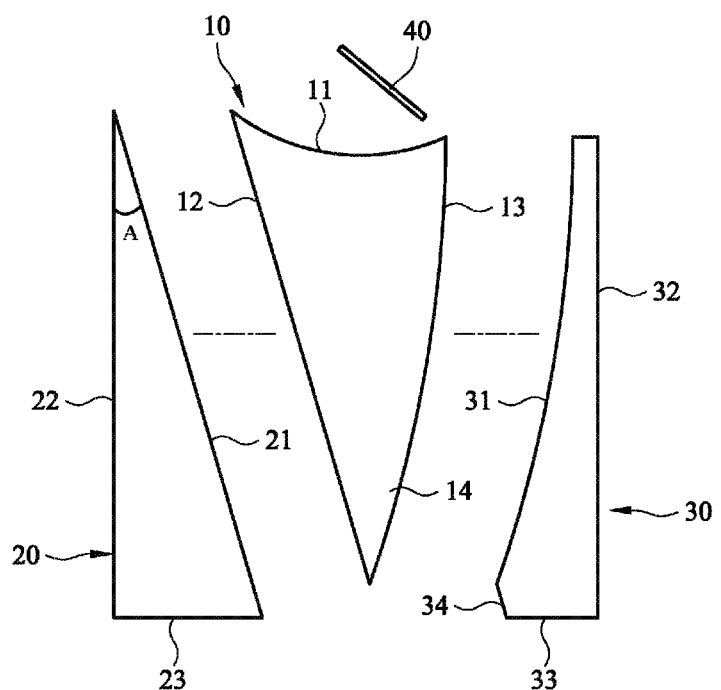
FIG. 2 is an exploded view of the first embodiment of the present invention.

FIGS. 1 and 2 illustrate a first preferred embodiment of the present invention, which comprises the following components.

A first prism 10 has an end (which can be defined as an upper end or a lower end) that is provided with or formed as a light incident concave curve 11, which can be a spherical curve, an aspheric curve, or a free-form curved surface, and comprises a light-exiting planar surface 12, which is arranged at an eye-adjacent side of the first prism 10 and has an end adjacent to the light incident concave curve 11, and a reflective curved surface 13, which is a free-form curved surface arranged at a field-adjacent side of the first prism 10 that is adjacent to a field of view and has an end adjacent to the light incident concave curve 11 and an opposite end intersecting the light-exiting planar surface 12 to form a converging end 14 of the first prism 10. The reflective curved surface 13 is provided with a coated film thereon to provide an effect of enhancing reflection.

A second prism 20, which is a wedge-shaped prism, comprises a light-entering planar surface 21, a light-exiting planar surface 22, and an end surface 23. The light-entering planar surface 21 is opposite to and faces the light-exiting planar surface 12 of the first prism 10 with an air gap S formed therebetween. The gap S is provided to cause total internal reflection when light is transmitting in the first prism 10 to reach the light-exiting planar surface 12 at a large angle so as not to cause influence on the second prism 20. The light-exiting planar surface 22 is arranged to face an eye. The light-entering planar surface 21 and the light-exiting planar surface 22 define an included angle A therebetween that is preferably between 15-30 degrees.

A third prism 30, which is a lens for light compensation, comprises a supporting concave curve 31 that is positioned against and mates the reflective curved surface 13 of the first prism 10 and a side planar surface 32 arranged at an external side that is adjacent to the field of view. The side planar surface 32 is substantially parallel to the light-exiting planar surface 22 of the second prism 20 for the purposes of not affecting human eyes perceiving an external-world image by allowing the eyes to see the external-world image in a way just like seeing through a window glass panel so as to make the external-world image clear. The third prism 30 is further provided with an end surface 33 and an abutting end 34 so that the combination thereof with the first prism 10 and the second prism 20 is a more complete and more correct.

In an actual embodiment, the second prism 20 and the third prism 30 can be manufactured in a combined, unitary form, wherein the abutting end 34 that is provided at one side of a lower end of the third prism 30 is combined or integrated with an ineffective portion of a lower end of the light-entering planar surface 21 of the second prism 20 to form a combined unitary structure, which includes a hollow space between the second prism 20 and the third prism 30 to receive the first prism 10 to fit therein. This simple modification is readily contemplated and no additional drawing and description for this modification will be provided.

The supporting concave curve 31 of the third prism 30 is positioned tightly against the reflective curved surface 13 of the first prism 10. This can be achieved with tight mating engagement, adhesive bonding, or being positioned such that an air gap present therebetween, but the present invention is not limited to such ways.

Figure 5:
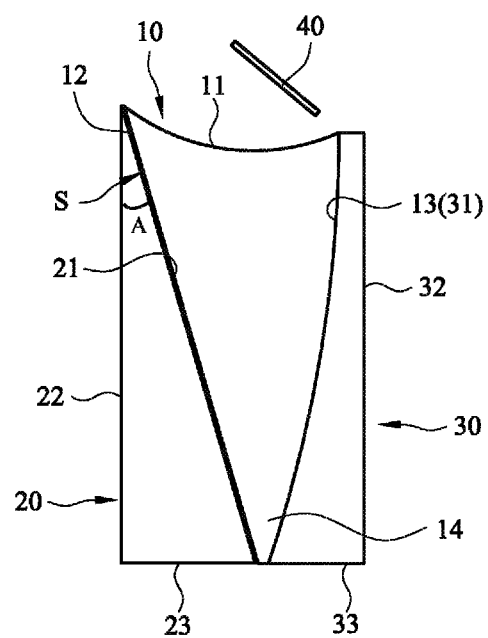
FIG. 5 is a schematic view showing a second embodiment of the present invention.

The first prism 10, the second prism 20, and the third prism 30 that are illustrated in for example FIG. 1 can be modified such that lower ends thereof where no light transmit therethrough can be cut off, such as those shown in FIG. 5, for saving space and materials used.

Figure 3:
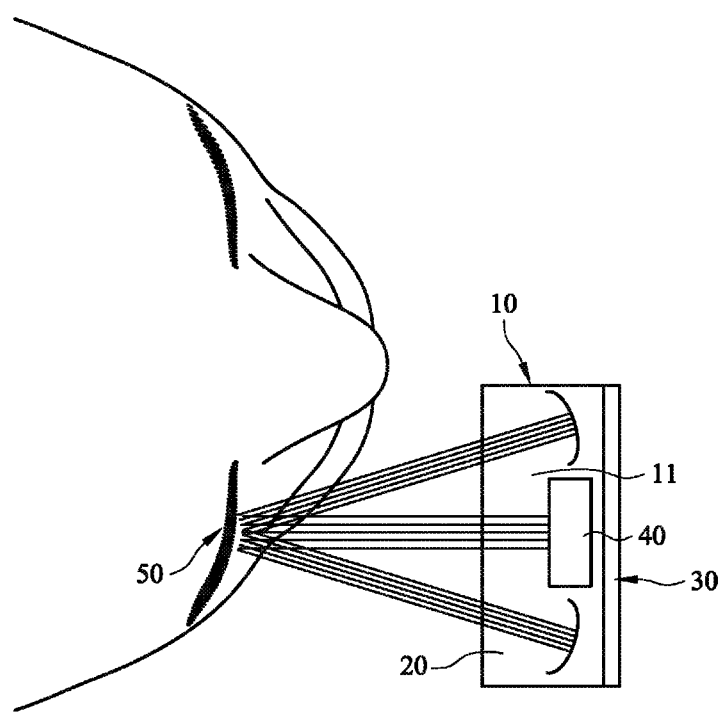
FIG. 3 is a top plan view illustrating an application of the first preferred embodiment of the present invention.

As shown in FIGS. 1, 2, and 3, an image displaying panel 40 is arranged at a site of or corresponding to the light incident concave curve 11 of the first prism 10. The image displaying panel 40 can be a self-luminous panel or a panel that reflects light and is used to reflect an image into the first prism 10. Preferably, the image displaying panel 40 has a size of 0.3 to 0.75 inches.

Figure 4:
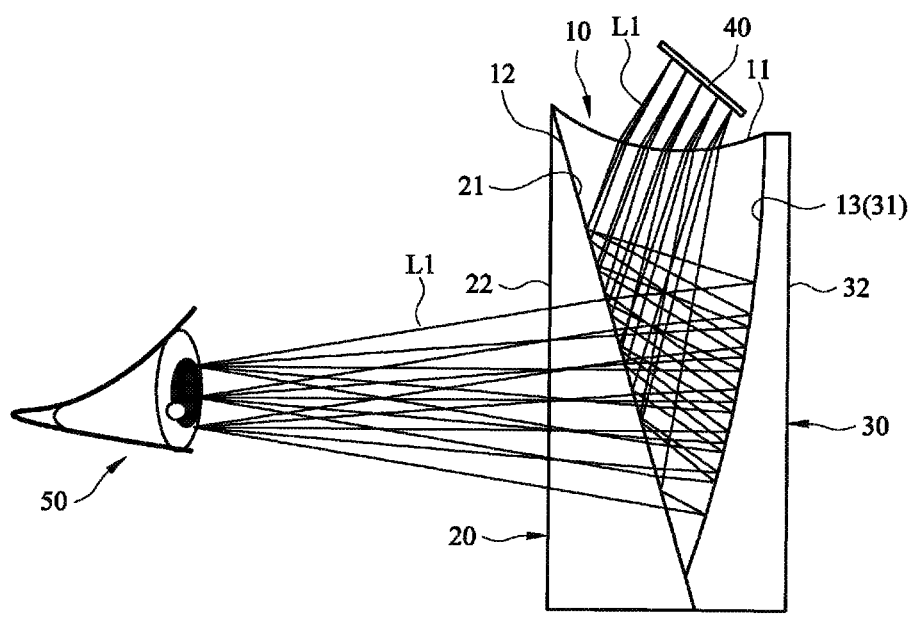
FIG. 4 is a schematic view illustrating a first example of use of the first embodiment of the present invention.
Figures 1, 4:
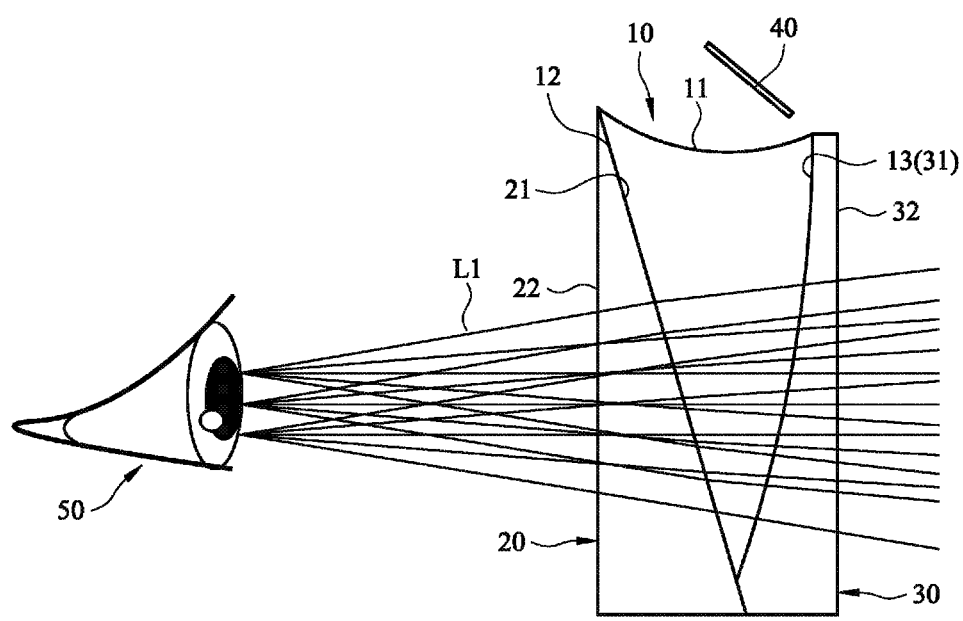

As shown in FIGS. 2, 3, and 4, in an example where the image displaying panel 40 is a self-luminous panel, image light L1 from the image displaying panel 40 travels through the light incident concave curve 11 of the first prism 10 to reach the light-exiting planar surface 12 and is subjected to total internal reflection toward the coated film of the reflective curved surface 13 to be further reflected and re-directed through the light-exiting planar surface 12, passing through the air gap S, and transmitting through the light-entering planar surface 21 and the light-exiting planar surface 22 of the second prism 20 to form an image on the retina of an eye pupil 50. For an external-world image to get into and form an image on the retina of the eye pupil 50, as illustrated in FIG. 4-1, the optical system of the present invention made up of the first prism 10, the second prism 20, and the third prism 30 is arranged such that the light-exiting planar surface 22 of the second prism 20 that is adjacent to the eye and the side planar surface 32 of the third prism 30 are set parallel to each other. This allows the eye to see the external-world image in a way similar to seeing outside through a window glass panel, so that seeing the external-world image by the eye is not affected and a clear image can be perceived.

Figure 6:
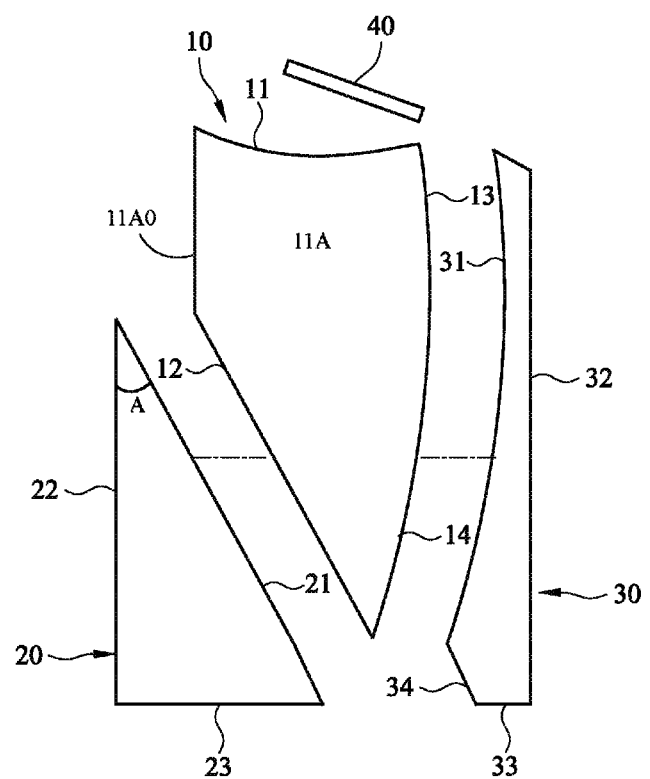
FIG. 6 is an exploded view showing a third embodiment of the present invention.
Figure 7:
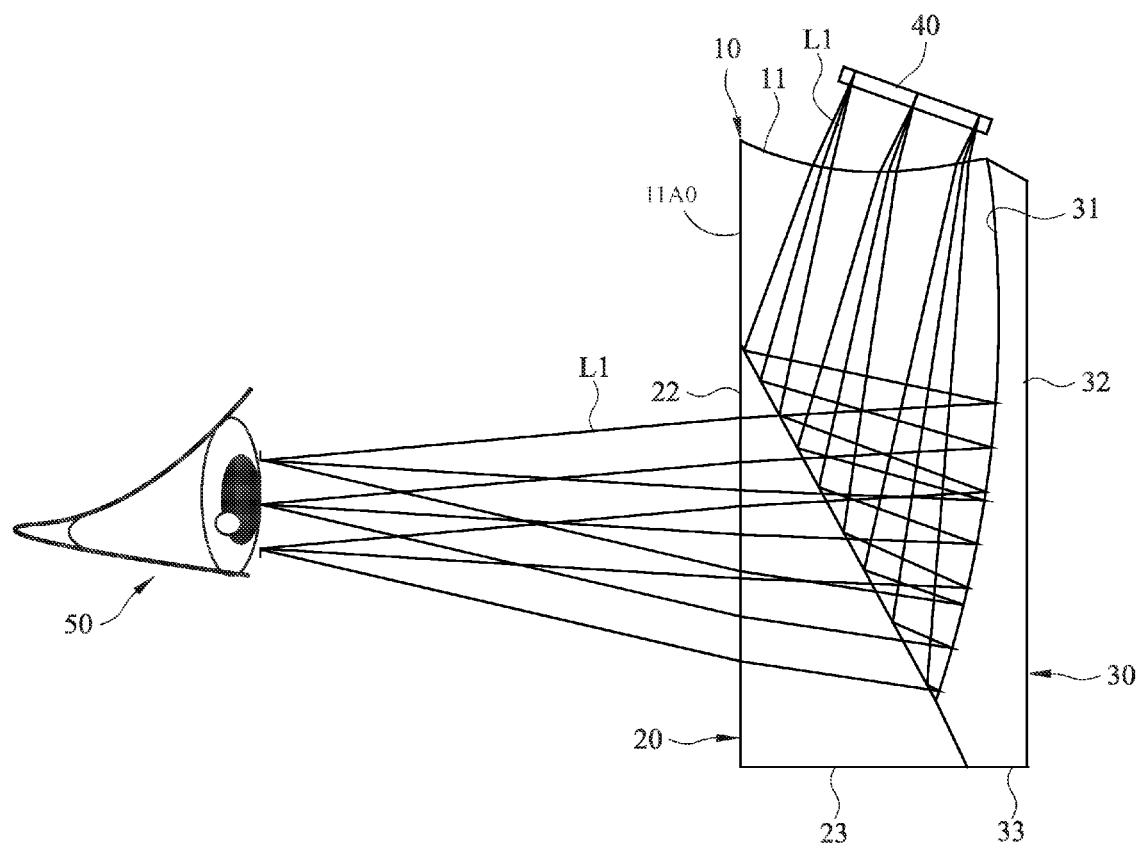
FIG. 7 is a schematic view showing third embodiment of the present invention in an assembled form.
Figure 8:
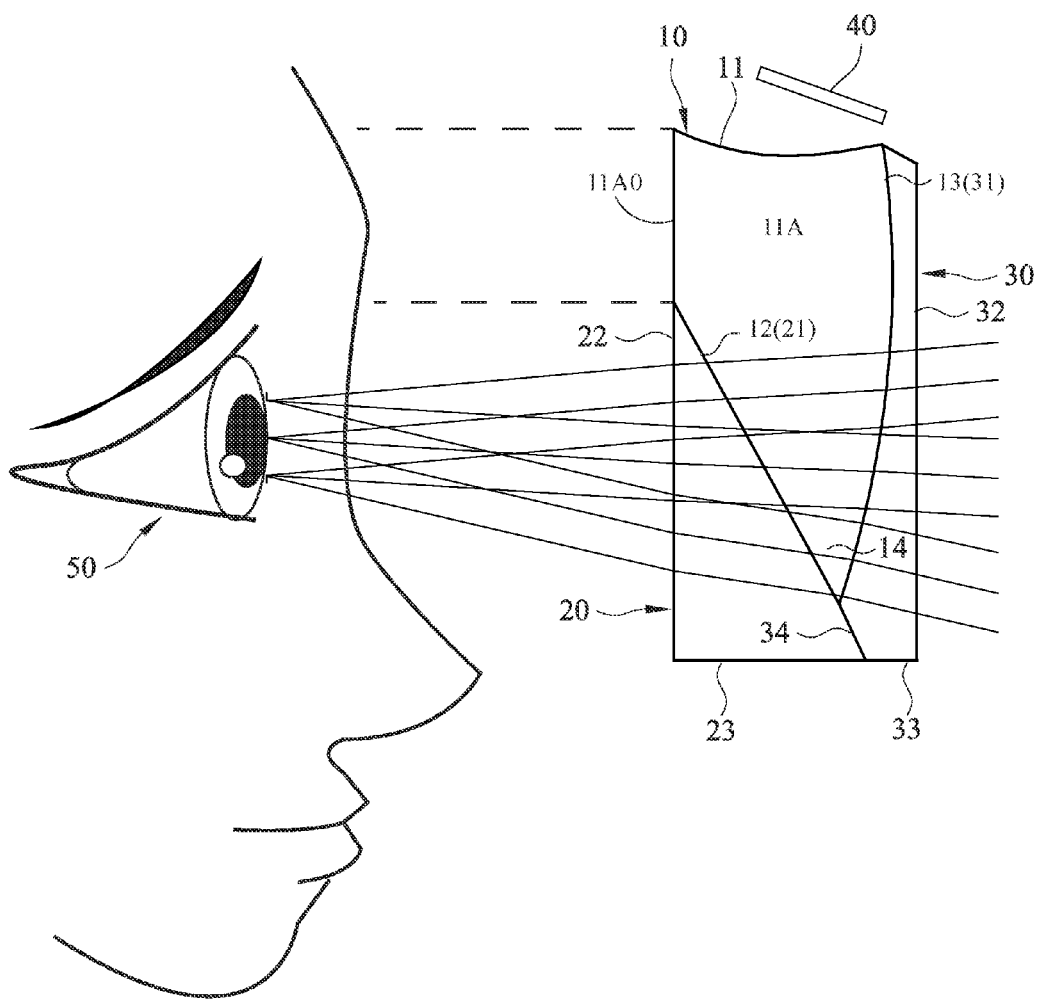
FIG. 8 is a schematic view illustrating a example of use of the third embodiment of the present invention.

Considering comfortableness of use of the present invention, as shown in FIGS. 6, 7, and 8, a third embodiment of the present invention is illustrated and exhibits a difference from the embodiment of FIGS. 1 and 2 in that an extension section 11A is provided between the light incident concave curve 11 and the converging end 14 of the first prism 10 such that a side 11A0 of the extension section 11A provides a distance from the light-exiting planar surface 22 of the second prism 20, which elongates the distance from the light incident concave curve 11 to the second prism 20 to reduce or alleviate visually perceivable stress caused by the image displaying panel 40 on the eye pupil 50 and also to reduce interference of the light from or on the panel 40 with the eye pupil 50 thereby making the use more confortable. The features of this embodiment are similar to those of the first and second embodiments, but this embodiment is more confortable in use.

The present invention provides advantages in respect of manufacture and use:

(1) As shown in FIGS. 4-1 and 8, since the optical system of the present invention that is made up of the first prism 10, the second prism 20, and the third prism 30 is structured such that the light-exiting planar surface 22 of the second prism 20 that is adjacent to eyes and the side planar surface 32 of the third prism 30 are set parallel to each other so as to allow the eyes to see an external-world image in a way similar to seeing outside through a window glass panel, so that seeing the external-world image by the eye is not affected and a clear image can be perceived. This overcomes the drawback of the prior art that uses a curved surface.

(2) As shown in FIGS. 1, 2 and 6, 7, according to the present invention, the light-exiting planar surface 12 of the first prism 10 is designed as a planar surface so that an element that involves a free-form curved surface may use the planar surface as a reference surface or datum for measurement and correction during the manufacture thereof, allowing for the acquisition of relatively high precision and making the manufacture process easy and efficient, and also provides various different parts with a common standard to make the manufacture even easier.

(3) The present invention eliminate the use of multiple free-form curved surfaces so that the manufacturing cost and time can be greatly reduced, making it more suitable for mass production and lowering down cost.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

We claim:

1. An asymmetric curved-surface prismatic image display optical system, at least comprising:
   a first prism, which has an end forming a light incident concave curve and comprises a light-exiting planar surface arranged at an eye-adjacent side and a reflective curved surface that is a free-form curved surface arranged at a field-side of the first prism;
   a second prism, which comprises a light-entering planar surface and a light-exiting planar surface, wherein the light-entering planar surface is opposite to and faces the light-exiting planar surface of the first prism with an air gap formed therebetween and the light-exiting planar surface adapted to face an eye;
   a third prism, which is a lens for light compensation and comprises a supporting concave curve positioned against the reflective curved surface of the first prism and a side planar surface at the field-adjacent side, the side planar surface being substantially parallel with the light-exiting planar surface of the second prism; and
   an image displaying panel, which is arranged to correspond to the light incident concave curve of the first prism;
   wherein image light from the image displaying panel travels through the light incident concave curve of the first prism to reach the light-exiting planar surface and is subjected to total internal reflection by the light-exiting planar surface toward the reflective curved surface to be reflected and re-directed through the light-exiting planar surface, passing through the air gap, and transmitting through the light-entering planar surface and the light-exiting planar surface of the second prism to form an image on the retina of the eye pupil.

2. The asymmetric curved-surface prismatic image display optical system according to claim 1, wherein the light incident concave curve of the first prism comprises a spherical curve.

3. The asymmetric curved-surface prismatic image display optical system according to claim 1, wherein the light incident concave curve of the first prism comprises an aspheric curve.

4. The asymmetric curved-surface prismatic image display optical system according to claim 1, wherein the light incident concave curve of the first prism comprises a free-form curved surface.

5. The asymmetric curved-surface prismatic image display optical system according to claim 1, wherein the reflective curved surface of the first prism comprises a coated film formed thereon.

6. The asymmetric curved-surface prismatic image display optical system according to claim 1, wherein each of the light-exiting planar surface and the reflective curved surface of the first prism has one end that is adjacent to the light incident concave curve and an opposite end that intersects each other to define a converging end of the first prism.

7. The asymmetric curved-surface prismatic image display optical system according to claim 1, wherein the second prism comprises a wedge-shaped prism that is formed of the light-entering planar surface, the light-exiting planar surface, and a reflective end surface.

8. The asymmetric curved-surface prismatic image display optical system according to claim 1, wherein the image displaying panel comprises one of a self-luminous panel and a non-luminous panel.

9. The asymmetric curved-surface prismatic image display optical system according to claim 1, wherein the supporting concave curve of the third prism is positioned against the reflective curved surface of the first prism by means of tight mating engagement, adhesive bonding, or being positioned with an air gap formed therebetween.

10. The asymmetric curved-surface prismatic image display optical system according to claim 1, wherein the second prism and the third prism are integrally combined together.

11. The asymmetric curved-surface prismatic image display optical system according to claim 1, wherein the light-entering planar surface and the light-exiting planar surface of the second prism define an inclined angle of 15-30 degrees therebetween.

12. The asymmetric curved-surface prismatic image display optical system according to claim 1, wherein an extension section is formed between the light incident concave curve and a converging end of the first prism to increase a distance between the light incident concave curve and the second prism.

* * * * *